United States Patent
Ibar

[11] Patent Number: 5,885,495
[45] Date of Patent: Mar. 23, 1999

[54] VISCOSITY CONTROL FOR MOLTEN PLASTICS PRIOR TO MOLDING

[76] Inventor: Jean-Pierre Ibar, 306 Carter St., New Canaan, Conn. 06840

[21] Appl. No.: 769,995

[22] Filed: Dec. 19, 1996

[51] Int. Cl.⁶ .................................................. B29B 13/00
[52] U.S. Cl. ........................... 264/69; 264/70; 264/442; 425/456
[58] Field of Search ............... 264/69, 442, 70, 264/443, 444; 425/456

[56] References Cited

U.S. PATENT DOCUMENTS

| | | | |
|---|---|---|---|
| 3,298,065 | 1/1967 | Pendleton | 264/442 |
| 4,288,398 | 9/1981 | Lemelson | 264/70 |
| 4,469,649 | 9/1984 | Ibar | 264/70 |
| 4,793,954 | 12/1988 | Lee | 264/70 |
| 4,919,870 | 4/1990 | Ibar | 264/70 |
| 4,925,161 | 5/1990 | Allan | 264/69 |
| 5,271,876 | 12/1993 | Ibar | 264/108 |
| 5,306,129 | 4/1994 | Ibar | 425/3 |
| 5,326,393 | 7/1994 | Ibar | 264/40.1 |
| 5,494,426 | 2/1996 | Ibar . | |

FOREIGN PATENT DOCUMENTS 1313840  2/1993  Canada .
0273830  7/1988  European Pat. Off. .
0274317  7/1988  European Pat. Off. .

*Primary Examiner*—James Derrington
*Attorney, Agent, or Firm*—Notaro & Michalos P.C.

[57] ABSTRACT

A method for controlling the viscosity of molten polymers, such as polycarbonate, takes place prior to a molding operation such as injection molding, extrusion, thermoforming or blow molding. When a significant reduction of viscosity is desirable, the plastic melt is submitted, at constant temperature, to the action of a vigorous mechanical extensional shear vibration, with minimum or no external pressure, at a constant amplitude and frequency, causing the melt to become highly elastic, and simultaneously it is fatigued, for a certain time at that temperature, maintaining this high elastic state, until the macromolecules have partially or totally disentangled, in a controllable manner, at which stage the melt is ready for a molding operation such as a simple quenching operation or an extrusion process followed by quenching to produce pellets or compounds with a better mix or a lower viscosity when remelted, or an injection molding operation where the melt viscosity has been greatly reduced allowing a better processability of the injected part, for instance allowing the use of a lower temperature of injection, a lower pressure of injection or both.

7 Claims, 12 Drawing Sheets

VISCOSITY CONTROL FOR MOLTEN PLASTICS PRIOR TO MOLDING

FIELD AND BACKGROUND OF THE INVENTION

FIG. 1 provides the viscosity curves (plotted on a Log scale) as a function of temperature for three polycarbonate grades having different molecular weight and molecular weight distribution (polydispersity). The viscosity measured is the complex viscosity ETA*, obtained with a parallel plate rheometer (Rheometrics RDAII), at constant oscillation frequency (10 rad/sec). Grade 1 is a high flow resin for compact disks and thin-wall molding applications; its molecular weight is the lowest of the three grades. Its mechanical performance is also the worst. Grade 2 is a general purpose polycarbonate with a molecular weight average above the critical molecular weight for entanglements, and Grade 3 is a branched polymer with high melt elasticity used in blow molding. One sees, in first approximation, that the viscosity at any given temperature is shifted by an amount scaled by the respective glass transition temperature,Tg, of the grades. By blending these three grades in any specific proportion, controlled by the Tg of the mix, one has the possibility to "custom fit" the viscosity curve for a given application. This clearly illustrates how the resin suppliers have succeeded in providing the plastic industry with means to lower the viscosity to ease up processing or increase melt elasticity by blending manipulation. The melt index is larger for resins which flow better. The molecular weight of the higher melt index resins is reduced, which explains the lower viscosity. The problem with that solution is that the mechanical performance of the lower molecular weight polymers is also severely reduced, a compromise for better processability which processors have to pay.

The industry would welcome a process which allows the decrease of viscosity of plastic melts without the need to change the molecular weight of the resins, with the added advantage of a reduction of the number of grades a resin manufacturer has to offer.

Shear thinning of plastic materials is well known and is used practically to lower the viscosity of melts during the filling stage of injection molding by increasing the speed of the injecting piston. This is particularly useful in the case of thin wall injection molding where considerable forces are required to fill the mold when the viscosity of the melt remains quasi-Newtonian. Rheologists essentially use two types of instruments to characterize the flow behavior of fluids: capillary rheometers and rotational shear viscometers. In the latter, either a true rotational motion or an oscillation is imparted to the melt, leading to the knowledge of either the steady shear viscosity or the complex viscosity, ETA*. It is well known to rheologists that plots of the complex viscosity, ETA*, versus w, the angular frequency, are similar to plots of viscosity versus shear rate, the so-called Cox Merz's rule.

It is also well known that shear thinning can be obtained, at a given temperature, by either increasing the shear rate or the frequency of oscillation of the melt at constant amplitude of oscillation. For example, the viscosity of PMMA at 239° C. can be reduced from 130,000 Poises to 20,000 Poises, more than 6 times, when the melt oscillates in shear at relatively low radial frequency, w=100 rad/s (16 Hz). In conclusion it is well known that the viscosity of a plastic melt can be reduced by shear thinning induced by vibration. The viscosity reduction is instantaneous and only prevails under vibration, i.e. it ceases if the vibration ceases. In other words, the viscosity reduction induced by shear thinning is not preserved and the melt is unaltered after the vibration ceases: after the melt oscillation has stopped, its Newtonian viscosity remains the same as for the initial-non vibrated melt. Therefore, the viscosity reduction induced by vibration-shear thinning is completely unstable and requires to be done while the material is injected or extruded, that is to say while the part is being shaped in a mold or a die. This implies the implementation of sophisticated vibration machinery added to traditional injection molding, blow molding or extrusion machines. Examples of such devices are described in other patents and applications (Refs 7a–7i). The same arguments can be said about the modification of the elasticity of a melt, which can be brought upon either by an increase of molecular weight or by melt vibration. The excess elasticity at a given temperature induced by the vibration condition ceases immediately at the interruption of the vibration.

In short, the use of vibration means to increase flow and modify in situ the viscosity of melts is well known. However, in order to clearly distinguish the differences between the present invention, which also uses vibration means to reduce viscosity, and the prior art, we summarize below the prior art as follows:

There are three categories of patented processes using vibration to modify the molding process and/or the properties of molded materials:

1. The common practical feature among the patents of the first category is their use of mechanical shaking/oscillation or ultrasonic vibration devices to homogenize and increase the density of the material molded, either in the liquid stage or in the solidifying stage, either at a macroscopic or microscopic level [3–6]. These references do not directly concern the use of vibration to lower the viscosity of a melt to increase their processability during conversion, nor do they address the use of packing vibration to increase the melt elasticity.

2. The second category of patents and processes using vibration is based on the fact that material rheology is a function of vibration frequency and amplitude in addition to temperature and pressure. This can be put to practical use to influence diffusion and rate sensitive processes which depend on viscosity and relaxation kinetics, such as nucleation and growth of crystals, blending and orientation [1–2, 7–11]. However, as said earlier, these references do not alter the viscosity of the melts in a way which preserves the viscosity reduction, and, the alteration is entirely dependent on the activation of the vibration means which create it, while the melt is cooled and vibrated.

3. In a third category, vibration is essentially used to generate heat locally by internal friction [20] or to decrease surface stresses at the wall interface between the melt and the barrel or the die to increase throughputs [12–16, 17–20]. The heat generated locally by pressure pulsation can be significant enough, in injection molding, as to avoid the premature freezing of the gate, resulting in a significant reduction of the shrinkage in the final part [20]. The significant reduction at the wall interface of the friction coefficient increases the throughput of melt flow through vibrating dies [12–16] and reduces orientational birefringence. These processes do not try to modify the viscosity of the melt per se, in a way which would be similar to a reduction of the molecular weight average of the macromolecules.

The industry would welcome a process which allows the viscosity to be significantly reduced and to stay reduced, at least for the time it is processed into a shaped article, without altering the molecular weight of the polymer and the inevitable degradation of the mechanical characteristics that results from it. Likewise, the industry would welcome a process which allows the melt elasticity to be significantly increased and stayed increased, at least for the time it is processed into a shaped article, by blow-molding or thermoforming, without the need to increase the molecular weight of the polymer and the creation of a new grade for this resin, with the inevitable costs associated with the promotion and the manufacturing of such a new grade.

In short, the industry would welcome a non-chemical process allowing the simplification of their resin line without the need to modify the processability and melt strength by varying the molecular weight average and the polydispersity of the resin into various grades.

As will become evident by reading the following disclosure, the prior art does not describe a method and apparatus capable of modifying and controlling in a significant way the viscosity and the elasticity of plastics without the need to either modify the molecular weight of the macromolecules or the addition of plasticizers, lubricants etc.

SUMMARY OF THE INVENTION

The present invention overcomes the prior art problems and shortcomings in a method and apparatus which produce a novel product by submitting a molten plastic at constant temperature to a vibration at constant frequency and amplitude of vibration, during a certain time and under specific vibration conditions, to obtain a controlled level of entanglements between the macromolecules, in order to significantly and controllably reduce the viscosity or increase the melt elasticity in a manner which can be beneficial to future molding operations.

In particular, in one embodiment of the present invention, extensional shear vibration is exercised on a molten plastic at constant temperature, constant frequency and amplitude of vibration, during a certain time and under specific vibrating conditions, to obtain a controlled decrease of the entanglements between the macromolecules, in order to significantly and controllably decrease the viscosity of the melt in a manner which can be beneficial to future molding operations requiring a lower melt viscosity.

Likewise, in a second embodiment of the present invention, packing vibration under pressure is exercised on a molten plastic at constant temperature, constant frequency and amplitude of vibration, during a certain time and under specific vibrating conditions, to obtain a controlled increase of the entanglements between the macromolecules, in order to significantly and controllably increase the elasticity in a manner which can be beneficial to future molding operations requiring a high melt elasticity, such as blow-molding or thermoforming.

In short, the purpose of the present invention is to provide a method and apparatus to modify the state of viscosity of polymeric resins by first bringing the melt to a determined temperature, vibrating the melt with the proper amplitude and frequency to have the melt assume and maintain at all times a high level of elasticity at that temperature, still avoiding slippage at the wall, and fatiguing the melt isothermally either in extensional shear or in compressive mode, for a time sufficiently short to avoid triggering conditions of melt instability, but sufficiently long to achieve the desired level of respectively either a reduction of viscosity or an increase of melt elasticity by a mechanism of alteration of the level of entanglements between the macromolecules of the melt. In the present invention, the melt is not cooled while the vibration is applied, except at the end of the vibration treatment if it is desirable to freeze the modified state of entanglements caused by the vibration. Unlike in the prior art, the parameters of vibration are not modified as a function of varying temperature in accordance to programmed variations which take into account the rheology of the material. If the parameters of vibration are adjusted during the vibration process, which occurs at constant temperature, this is to take into account the requirement to keep the melt at a constant very high level of vibration induced elasticity. This level of elasticity is normally measured by the ratio (G'/G*) in the case of sheared melts, or (K'/K*) in the case of pressurized melts according to this invention, where G' is the storage shear modules of the vibrated melt and G* is the complex modules, K' is the storage bulk modules and K* the complex bulk modules. Cooling means are adapted to allow the vibrated material to be held at constant temperature despite of the heat generated by the melt because of the vibration.

It is clear that the present invention is at variance with those inventions mentioned in the prior art which specifically rely on the time-temperature superposition principle to alter the viscosity during the molding process, activating the vibration while the melt is cooled in the mold, and programming the vibration parameters (amplitude and frequency) to vary as a function of temperature, as temperature itself varies.

More specifically, the present invention discloses that a relatively stable decrease of melt viscosity is achieved by submitting the melt, for a certain time, to a periodic extensional shear oscillation of determined amplitude and frequency at constant temperature. The melt can be sheared in torsion between two parallel plates which are moved in an oscillatory way with respect to each other. In one embodiment of the present invention, one of the two parallel plates is fixed and the other one is oscillated either in a longitudinal shear motion or in a rotational motion or in a combination of these two modes. In another embodiment of the present invention, both parallel plates are moved independently but in a coordinated and programmed way, for example, both plates are rotated simultaneously and concentrically, but in opposite directions, with the same frequency and amplitude but out of phase from one another. In another embodiment, the plates are not rotated at the same frequency. In yet another embodiment of the present invention, the top and the bottom parallel plates not only rotate in a torsional way around a mean position determined by a fixed axis, but are eccentric to one another and able to change their relative facing position according to another periodic movement controlled independently but in coordination with the torsional oscillations.

In another embodiment of the invention, the shear vibration of the melt is created by inserting the melt between concentric tubes rotating in an oscillating way around the same axis, and/or back and forth longitudinally in a way identical to the situation described for the parallel plates above, and with the same variety of combinations between the pure longitudinal shear vibrations or pure rotational vibrations, with one or two surfaces moving in a controlled way at a time. In another embodiment of the present invention, extensional shear of the melt occurs by rotation at high speed of at least one of the parallel surfaces in order to create centrifuge forces on the melt. This can be done with both the tubular or flat surface configurations.

The present invention also discloses that a relatively stable increase of melt elasticity is achieved by submitting the melt, for a certain time, to a periodic compressive force of determined amplitude and frequency at constant temperature. The melt can be compressed under vibration by the action of two reciprocating pistons which are moved in an oscillatory way with respect to each other, being sure, however, that the resulting effect on the confined melt is a packing compressive force with minimum or no shear present. In one embodiment of the present invention, one of the two pistons is fixed, or non-existent, and the other one is oscillated at a determined amplitude and frequency to produce a vibrating pressure on the plastic melt while the temperature is maintained constant by the adjunction of proper heating and cooling means around the vibration chamber. In another embodiment of the present invention, both pistons are moved independently, although in a coordinated and programmed way, for example, both pistons are vibrated with different frequency, amplitude and phase. In another embodiment, the pistons are vibrated at the same frequency, same amplitude and in phase, while their average position with respect to one another is also controlled, such as to increase or decrease the average pressure of the confined melt according to another movement, periodic or non periodic, controlled independently, yet in coordination with the oscillations of the individual pistons.

In one embodiment of the invention, the melt is ready for another molding operation at the end of the vibration treatment, for instance it is pumped away from the vibration site, shot sized, and injected into a mold with the help of an injecting device such as found in traditional injection molding machines. In other applications, the hot treated melt is extruded with help of the traditional extrudes, whether it is for the manufacturing of films or parisons and preforms. The treated melt has the tendency to loose with time the benefits imparted upon it by the vibration treatment, whether it is a reduction of viscosity or an increase of melt elasticity. In fact, the benefits imparted by the present invention would be lost entirely if the melt were to be reheated above a certain temperature, which is approximately located for amorphous polymers between $T=1.22*Tg$ and $1.45*Tg$, in Kelvin degrees, where Tg is the glass transition temperature, or $1.22*Tm$ for crystallizable polymers, where Tm is the melting temperature. At temperatures below this critical temperature, the melt recovers slowly its pre-treatment state and the benefits imparted by the vibration treatment slowly disappear. In short, the modified melt through the treatment per the current invention is relatively unstable.

However, it has been determined experimentally that the recovery process is kinetically controlled and that the time required to loose the benefits can be sufficiently long to allow the use of most of the benefits imparted by the present invention to be carried over to the molding stage which follows. In other words, although the treated melt is relatively unstable, it is possible to preserve most of the benefits imparted by the present invention and maintain them effective during the time required to mold the treated melt in post-treatment processes such as injection molding, extrusion, thermoforming, or blow-molding.

In another embodiment of the present invention, the melt is first shear vibrated according to the embodiment to reduce viscosity in a controllable manner and then pack vibrated under controlled pressure according to either another embodiment of the present invention or using one machinery equipment described in the prior art, for example an injection molding machine equipped with a vibratory packing device such as those described in Refs. [8] and [9]. This allows the complete control of the initial entanglement state of the melt prior to the packing operation and eliminates the previous thermal history which are often the cause of properties fluctuation.

In another embodiment of the present invention, the vibrated melt is quenched just at the end of the treatment, per the present invention, to freeze-in the benefits of the vibration treatment and avoid the recovery process to take place which would allow the melt to return to its pre-treatment viscosity and elasticity. The quenched melt is cooled until it has become a solid material which can be grinded into small pellets or powder. Yet, in another embodiment of the present invention, the vibrated melt per the present invention is extruded or co-extruded with other melts and additives, and pelletized just after the vibration treatment is performed to obtain solid granules or pellets of the treated melt. The extrusion is done in a way which minimizes the recovery process to take place, for example, under minimum pressure in the case the vibration treatment reduced the viscosity of the melt by extensional shear to reduce the entanglements, and conversely, under minimum shear in the case the vibration treatment increased the elasticity of the melt by favoring the interpenetration of the macromolecules and increasing the entanglements.

For this latter embodiment of the present invention, the benefits imparted by the vibration treatment of the melt are preserved in the pellets, granules or powders by the quenching of the melt across solidification transitions. When these pellets, granules or powders are re-heated to melt, the process of recovery described above starts to thermally re-activate and the melt viscosity or elasticity slowly returns to its pre-treatment level dictated by the molecular weight, molecular weight distribution, temperature and pressure. In short, the reheated melt looses the benefits which were imparted by the vibration treatment per the present invention and frozen-in to preserve them. However, the time required to completely loose all the viscosity reduction benefits or the elasticity improvement benefits is kinetically driven and long enough to allow the use of these benefits to be effective, under certain conditions of use. For example, fast heating processes, such as dielectric or microwave heating, can be used to avoid exposing the modified pellets to a long heating cycle before the temperature of use is reached. Dielectric heating is known to be very fast for frequencies of the voltage field fluctuation chosen to optimize internal friction.

In another embodiment of the present invention, the vibrated melt per the invention is chemically cross-linked or radiation cured at the end of the treatment to freeze-in the state of entanglements produced by the treatment and prevent the recovery process to take place. This stabilized melt is then either directly routed to a post-treatment molding operation or quenched to obtain a solid material. In another embodiment of the invention, bulges and aspirates cover the surfaces in contact with the sheared melt. In yet another embodiment, the surfaces in contact with the polymer melt are coated, to increase the adhesion of the melt to the surface and avoid slippage, with a film of specific material.

These and other meritorious advantages and features will be more fully appreciated from the following detailed description of the invention and the appended claims.

DESCRIPTION OF THE PREFERRED EMBODIMENTS

Figure 1:
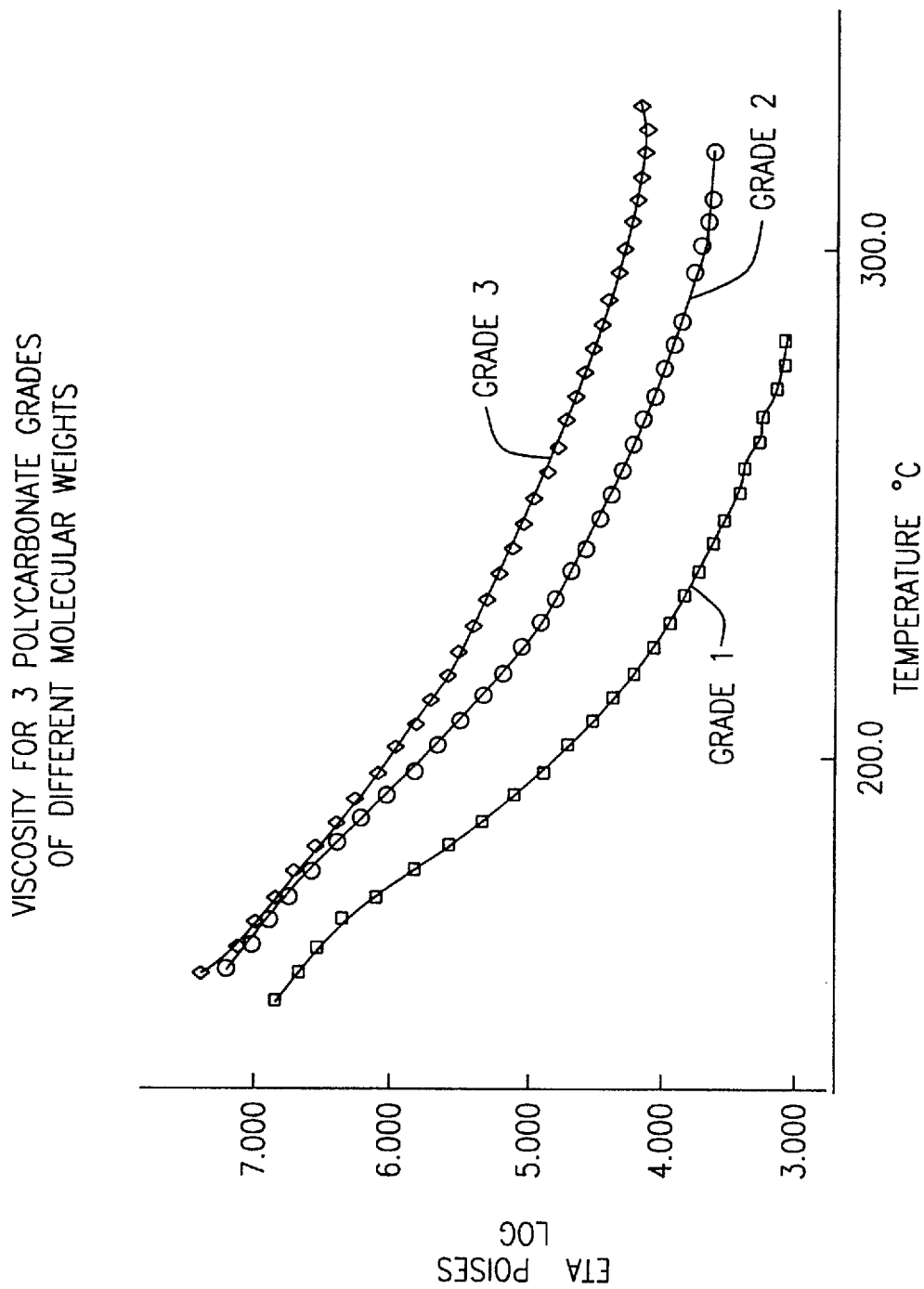
FIG. 1 is a graph of viscosity of three polycarbonate grades as a function of temperature.

FIG. 1 displays the Log of viscosity of three polycarbonate grades as a function of temperature. The grades have different molecular weight average and polydispersity ratio. This figure demonstrates how the resin manufacturers cope with providing the industry with means to modify the melt viscosity or elasticity of a resin, by changing the molecular weight characteristics and the level of branching.

Figure 2:
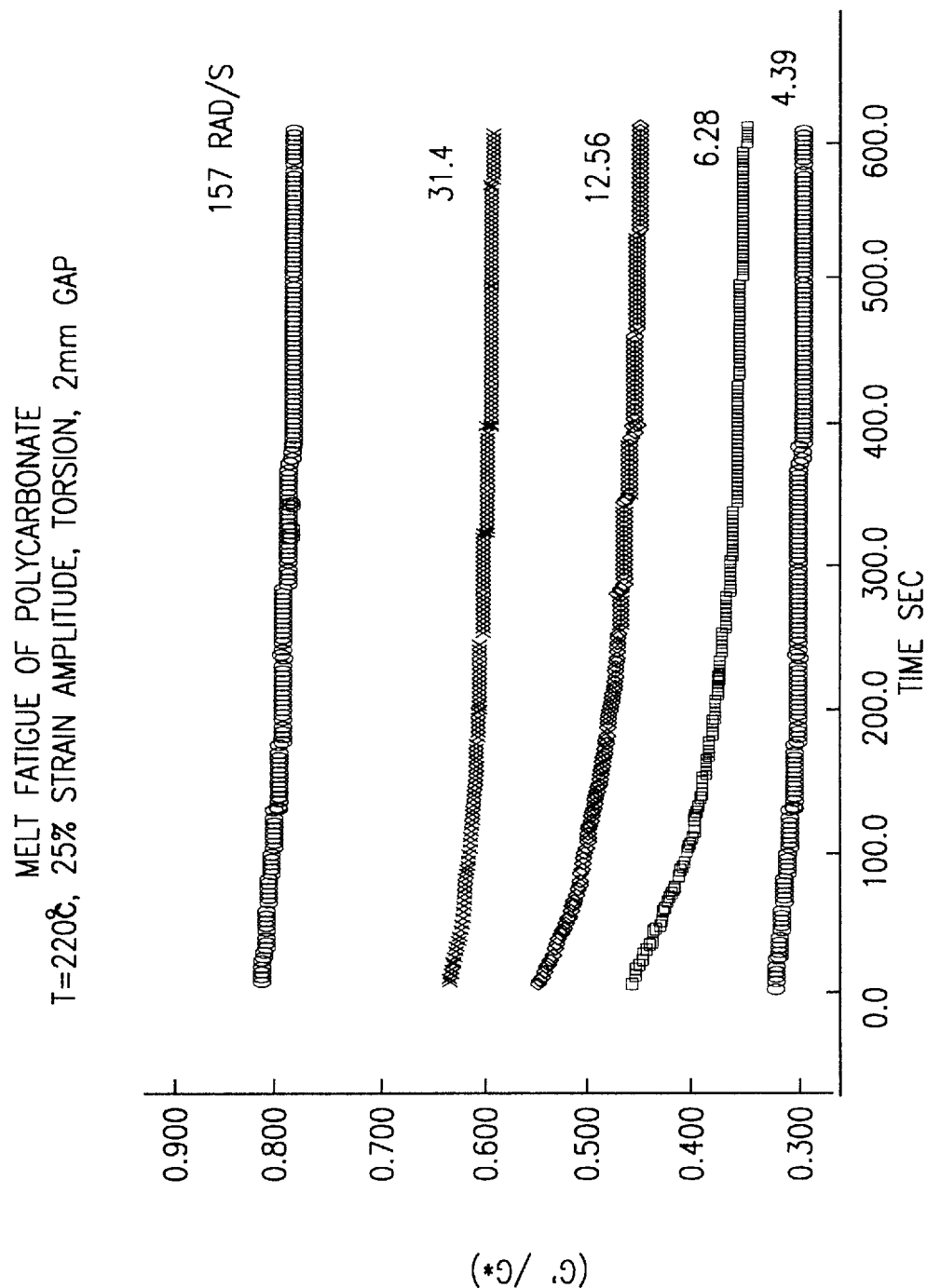
FIG. 2 is a graph of the variation of the ratio (G'/G*) during a shear vibration treatment of a general purpose polycarbonate performed at 220° C. for 600 seconds at various frequencies designated on the figure (expressed in rad/s)

FIG. 2 displays the variation of the ratio (G'/G*) during a shear vibration treatment of a general purpose polycarbonate performed at 220° C. for 600 seconds at various frequencies designated on the figure (expressed in rad/s). The melt is shear vibrated in torsion between two parallel plates separated by a 2 mm gap. The top plate is oscillating, the bottom plate is fixed. The strain amplitude of vibration is 25%. The temperature in the vibration chamber is maintained constant within 1° C. The ratio (G'/G*) is related to the amount of elasticity stored in the plastic at the corresponding temperature. The closer this ratio is to 1 the more elastic energy is stored at each cycle. The process according to the present invention is optimized for (G'/G*) ratios between 0.76 and 0.93. These high values of melt elasticity are obtained by combining relatively high shear vibration frequencies, up to 100 Hz, lower melt temperatures and high strain amplitudes. For example, the efficiency of the invention in reducing the melt viscosity of polymers in pure torsional shear, according to the present invention, does require not only a high melt elastic state, but also a high strain amplitude to put the melt in extension during fatigue. Depending on temperature and frequency, the strain amplitude can be chosen between 10% and 90%, which corresponds to the domain of non-linear viscoelastic behavior. However, the vibration parameters should be chosen and adjusted during fatigue to avoid melt instability to occur, which is generally observed by a sudden drop of the ratio (G'/G*). According to one embodiment of the invention, the strain amplitude is increased stepwisely from an initial low value to the high value required for the process to be successful, letting at each step some shear-thinning to take place, which eases the value of the torque required to maintain a given strain amplitude. This adjustment of the amplitude at the initiation of the fatigue process also prevents the melt to slip at the contact with the top and bottom surfaces. FIG. 2 demonstrates clearly that the ratio (G'/G*) increases significantly with the frequency of shear vibration at constant strain amplitude of vibration and temperature. The ratio (G'/G*) also increases as temperature decreases, at constant frequency and strain amplitude of vibration, until it reaches a maximum and starts to decrease. The temperature for the maximum varies with frequency but is generally found 20 to 25° C. above Tg for a frequency of 1 Hz. FIG. 2 also shows that the ratio (G'/G*) remains practically constant during the 10 minutes of fatigue which occurs at this temperature. The strain amplitude of shear vibration may be adjusted upwardly to compensate for a slight loss of the elasticity of the melt during the fatigue process.

Figure 3:
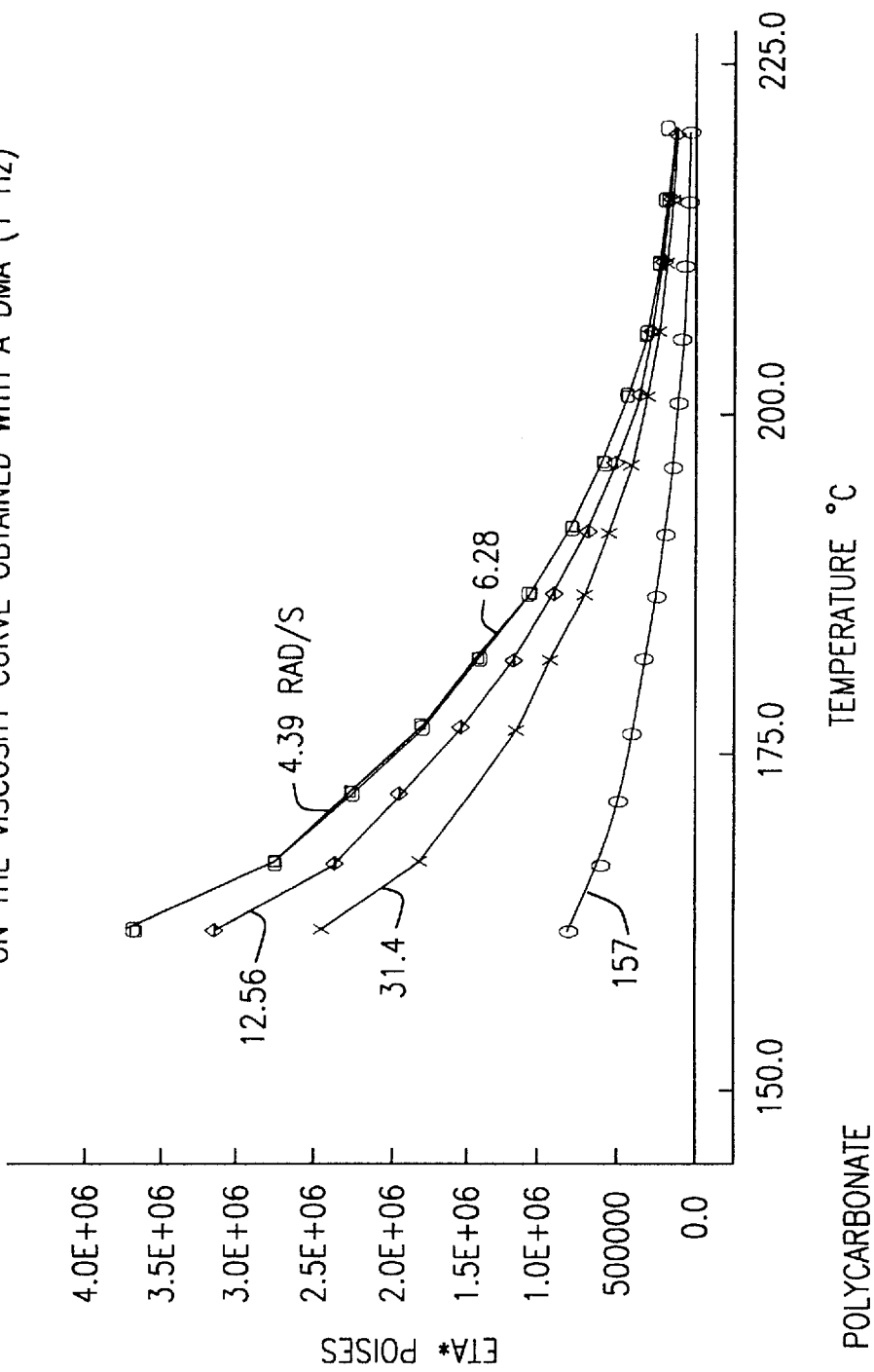
FIG. 3 is a graph of the complex viscosity, ETA*, measured at decreasing temperature.

FIG. 3 represents a plot of the log of the complex viscosity, ETA*, measured at decreasing temperature, every 5 degrees, in a Dynamic Mechanical Analyzer (Rheometrics RDAII), working in the linear region of viscoelasticity, e.g. at a constant frequency of oscillation, 1 Hz, and low strain amplitude. The numbers near the curves refer to the value of the frequency in rad/sec which was used during the melt vibration fatigue treatment at 220 ° C., according to the present invention. The top curve (4.39) of FIG. 3 corresponds to the viscosity of the melt of FIG. 2 after it has been fatigued at a frequency of 4.39 rad/s for 10 minutes (bottom curve of FIG. 2). In other words, FIG. 3 provides the temperature dependent viscosity of the melts after treatment at a given frequency and elasticity, as provided in FIG. 2. The top two curves of FIG. 3 (corresponding to melt fatigue treatments at respectively 4.39 and 6.28 rad/s) coincide almost entirely with the flow curve obtained for a reference melt, for which there has been no shear vibration treatment at 220° C. In these cases, the shear vibration treatment does not modify the subsequent viscosity behavior of the melt. The treatment is not successful in reducing the viscosity of the polymer. However, FIG. 3 shows that for a melt fatigue frequency starting at 12.56 rad/s, i.e. for 31.4 or even more obvious for 157 rad/s, the viscosity behavior is significantly different from the reference sample viscosity, which coincides with the top curve. In fact, the viscosity for the sample fatigued at 157 rad/s for 10 minutes is approximately 5 times lower than the reference viscosity at all temperatures. This clearly demonstrates the benefit of the treatment.

The following factors have been shown to regulate the efficiency of the vibration treatment in viscosity reduction per the present invention: the temperature of the melt, the frequency of the vibration, the strain amplitude of the vibration, the time the vibration is effective, the surface friction coefficient of the plates or tubes confining the melt, the gap dimension between the plates or tubes, the amount of stored elasticity in the sample and the amount of extensional shear during the treatment. Any person skilled in the art of plastic processing and polymer rheology would know how to adjust the respective value of these variables to obtain the same level of efficiency in viscosity reduction. For example, temperature can be lowered or increased by a few degrees and adjustments could be made to the frequency and/or the strain amplitude to obtain the same (G'/G*) ratio, characteristic of the rheological state of the material. When a torsional shear mode is used, the frequency of vibration and strain amplitude play essentially the same two roles of: 1. increasing the amount of elasticity in the melt and 2. increasing the level of extensional shear resulting from a centrifugation effect. The melt, which assumes the rheological state of a rubber under these vibration conditions, is fatigued in extensional shear, with, as a result, the slow separation of the entangled macromolecules and the reduction of the area of their interaction. The net result is a decrease of the melt viscosity without the breakage of the macromolecules. Any person skilled in the art of stress analysis and mold design would know how to combine the relative motion of parallel plates or concentric tubes to submit a melt to a vigorous shear vibration, under no or minimum compressive force, and its simultaneous extension by application of a complementary motion.

Figure 4:
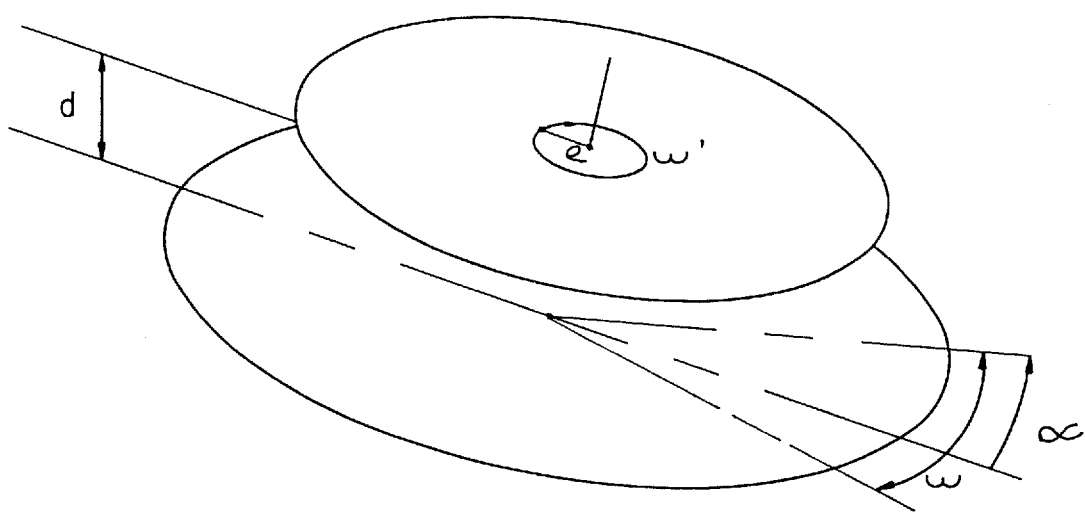
FIG. 4 is a schematic view of an example of a design according to the present invention in the case of parallel disks.

FIG. 4 provides an example of such design in the case of parallel disks. In FIG. 4, the bottom disk is oscillated with frequency w and strain amplitude a around a fixed axis. The top disk is "rubbing the melt" in a small independent circular motion with rotation speed w' and eccentricity e. The gap thickness is d, typically 1 to 2 mm. In this configuration of two parallel disks confining the melt in the gap in between, two coordinated shear motions of the melt are available to bring the melt into a high elastic state and fatiguing it in extension. The amount of eccentricity determines the amount of shear extension during fatigue. In a simplified embodiment of the present invention, the bottom plate is fixed and the vibrating shear comes solely from the rubbing motion of the top disk. For such an embodiment the speed of rotation must be greatly increased, since the single motion must fulfill both roles of creating a high elastic state and fatiguing the melt in extension.

In the similar case of concentric tubes, the relative rotation of the tubes at a certain vibration frequency and strain amplitude in the hoop direction can be used to determine the rheological state of the melt, whereas the coordinated motion on the perpendicular longitudinal direction determines the level of extensional shear during fatigue. Conversely, of course, the vibration parameters for the motion along the longitudinal axis could be the ones which determine the rheological state, while the shear motion in the hoop direction could be programmed to determine the amount of extensional shear.

Any person skilled in the art of plastic processing design would know how to use and adapt the apparatus described above and build machines which would also include heaters to heat the disks or the tubes, heat exchangers to maintain the melt temperature constant or to allow a quench of the plastic at any particular time, or would combine the use of gear pumps and melt conveyers to feed the melt in and out of the melt vibrating area, whether annular or slit dies are used, or a compressive chamber in the case of packing under vibrating pressure. For example, molten polymer can be conveyed through an external flexible hose feeding the vibrating plates from the center of the top disk, or from the side of a vibrating pressure chamber. The treated melt can be scratched off the disk plates at the end of the vibration treatment by opening the die gap to let use of an automated scratching tool collecting the treated resin into a secondary tank from which it is quickly gear-pumped to the next molding stage. In another embodiment of this invention, the two facing disks are motioned with respect to one another in a way which slowly expands (bulges) the melt towards the periphery where it is cut and conveyed away, or cut and quenched simultaneously, by a rotating knife coming in proximity, but not in contact, with the edge of the disks. New molten polymer is continuously fed from the center and is sheared away to the periphery in exactly the time required for the fatigue process to be successfully disentangling the macromolecules to the desired level.

As another example, several of the concentric tubes operating as per the requirements of the invention can be positioned parallel to each other with their longitudinal axis vertical. The inside tube is fixed and the outside tubes are geared to rotate and translate together, powered from common sources for each motion-transverse rotation and longitudinal extension. The top of the tubes is caped and communicates with a common feeder, such as an extruder line or a gear pump, working under no pressure conditions. At the bottom of the tubes, the fatigued melt budges out and is cut by a moving knife. The pieces from the several tubes are collected continuously and gathered by gravity to a common tank from which it is pumped away to the next molding station.

Any person skilled in the art of low frequency vibration (1 to 100 Hz) would know how to design electrical motors, or hydraulic systems operating with actuators and servo-valves, capable of providing the shear or packing forces required to rotate tubes periodically, move parallel disks and plates in torsion and in eccentric motion, or pack a confined melt between one or two vibrating pistons. Any person skilled in the art of controls, PID loops, and computer aided controller design, would know how to build the controller to drive the actuators, heat and cool the tubes and plates, monitor and record the melt temperature, the torque value, or the pressure value, the frequency of the vibrations, and the dynamic parameters G', G* and K', K*.

Figure 5:
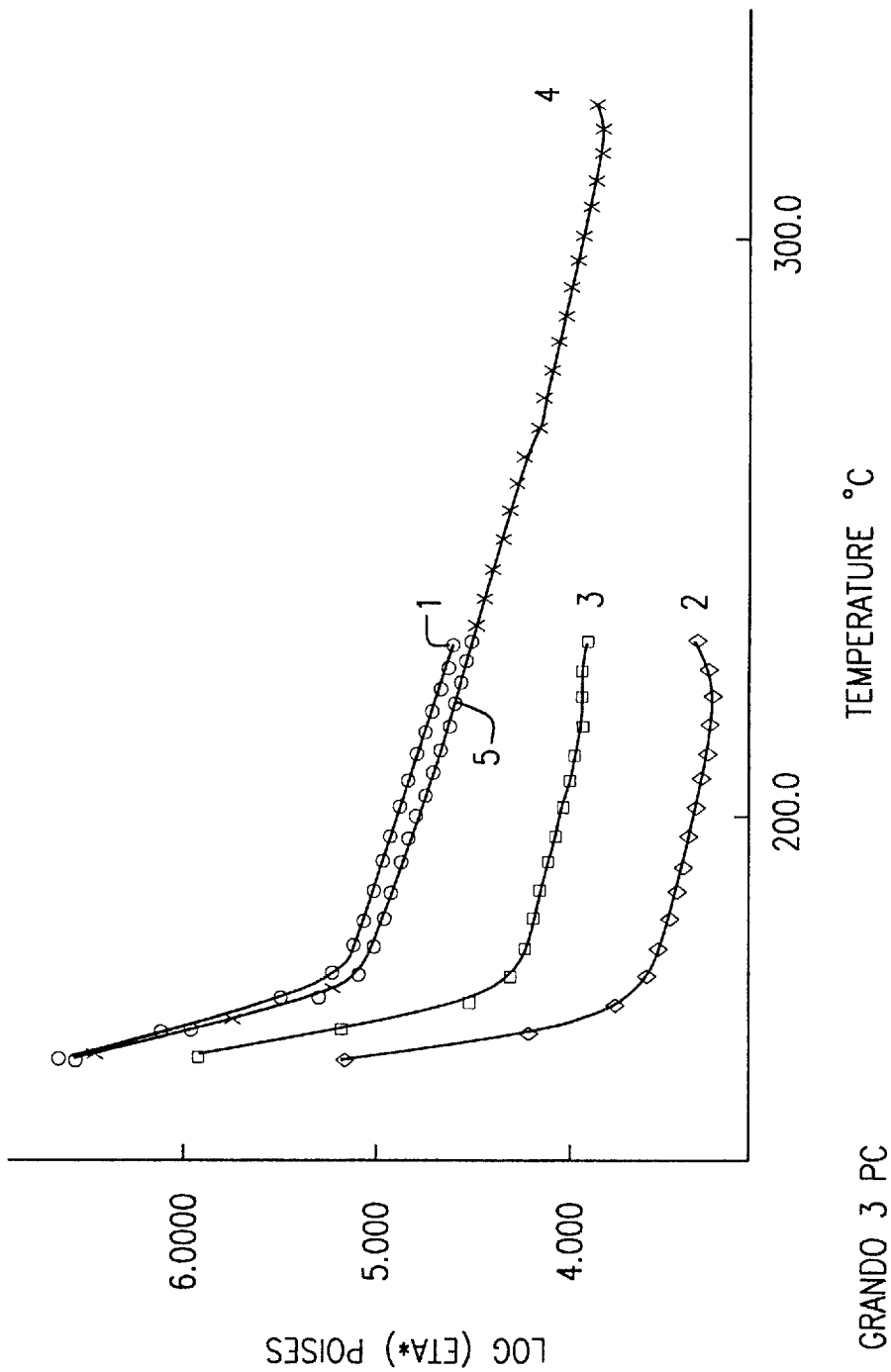
FIG. 5 is a graph of a function of temperature for five different melts which have been shear melt fatigued in pure torsion and/or allowed to recover from melt fatigue.

FIG. 5 provides the viscosity curve (as a function of temperature) for five different melts which have been shear melt fatigued in pure torsion and/or allowed to recover from melt fatigue in a way which is explained below:

The resin is Grade 3 polycarbonate, which is a branched polycarbonate with a high elasticity level, ideal for blow-molding applications. Trace 1 is the viscosity curve of a reference sample, which has not been fatigued, and held without any mechanical constraint at 230° C. for 1800 seconds. The viscosity curve is obtained at the end of the 1800 seconds with a DMA apparatus working at 16 Hz.

Figure 6:
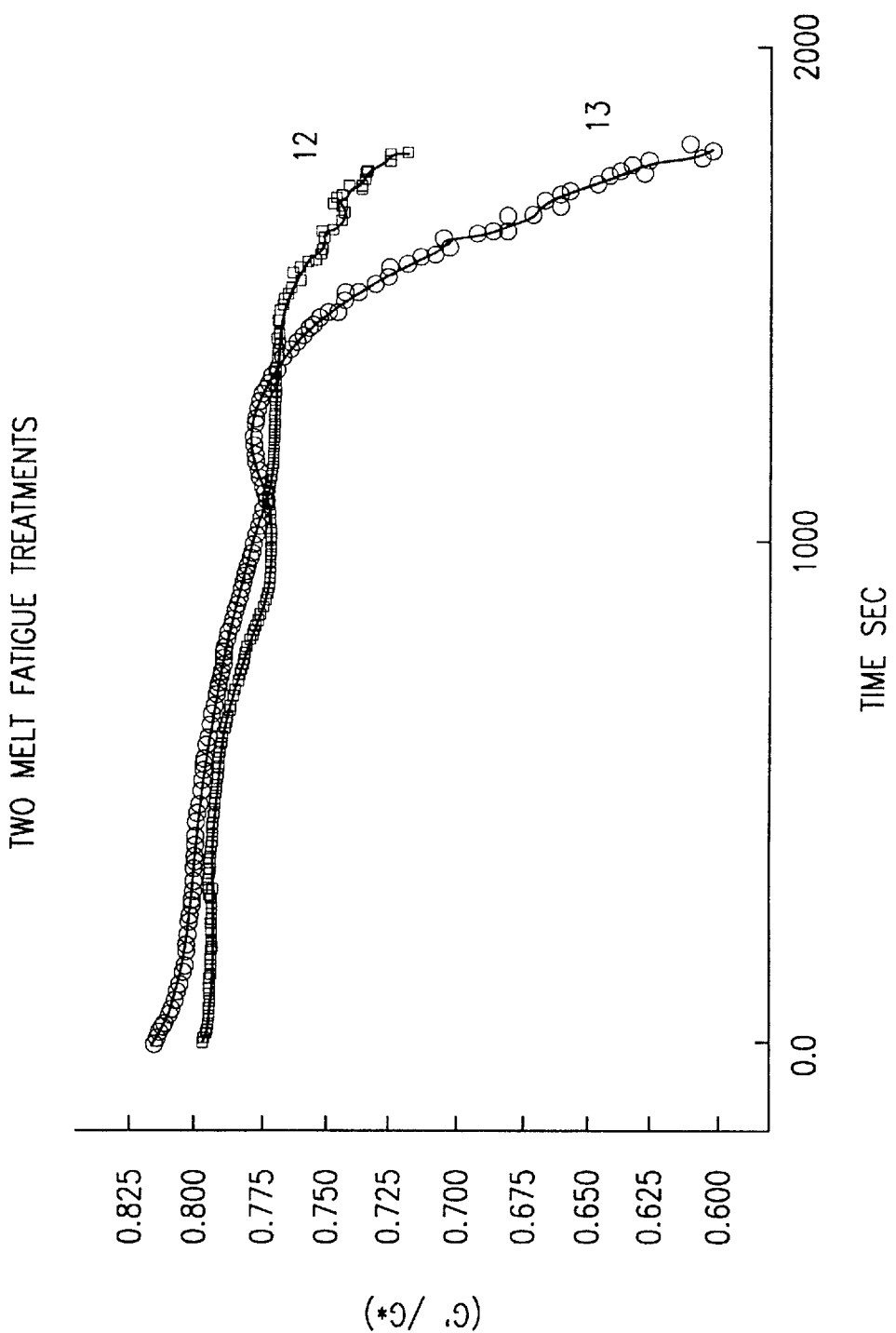
FIG. 6 is a graph of two melt fatigue treatments 12 and 13 which provide the two melts analyzed by DMA in FIG. 5, respectively 2 and 3.

Traces 2 and 3 are the viscosity curves for the two melt fatigue treatments shown in FIG. 6. Trace 2 corresponds to fatigue-melt 12 of FIG. 6 and Trace 3 to fatigue-melt 13. The viscosity curves are obtained at the end of the treatment with the same DMA rheometer also working at 16 Hz.

Trace 4 is a viscosity curve performed on the melt labelled "2" in FIG. 5 after it is cooled in the DMA instrument down to 138° C. (below Tg), and then reheated for one minute, under no constraint, to 327° C. The DMA measurements start at 327° C.

Trace 5 is a viscosity curve performed on the melt labelled "3" in FIG. 5 after it is cooled in the DMA instrument down to 138° C. (below Tg), and then reheated for one minute, under no constraint, to 327° C. The sample is cooled again and DMA measurements are performed starting at 230° C.

FIG. 6 displays the two melt fatigue treatments 12 and 13 which provide the two melts analyzed by DMA in FIG. 5, respectively 2 and 3. It is clear from FIG. 5 that the viscosity curve of both melt 2 and 3 is located far below the reference viscosity curve 1, showing the significant benefit of the present invention. However, there is a significant difference between melt 2 and melt 3 in terms of the efficiency of their respective treatment in reducing the melt viscosity. The two melt treatments 12 and 13 have most of the vibration parameters identical (157 rad/s frequency, 230° C.) except for the strain amplitude history -to reach 50% strain- which was built up a little bit faster for treatment 13. The temperature of melt 12 was also slightly lower at the beginning. One sees that (G'/G*) is almost identical for the two treatments up to approximately 1200 seconds, where the (G'/G*) of treatment 12 sharply drop down to lower values (final value: 0.6). This sharp change of melt behavior is attributed to either slippage at the surface or melt instability. This behavior is not observed for treatment 12 (final value of G"/G* : 0.72). The melt of treatment 13 is incoherently vibrated after 1200 seconds, which corresponds to a loss of internal elasticity and a slowly recovery process recreating entanglements. The result on the viscosity curve in FIG. 5 is the partial loss of some of the viscosity reduction obtained during the first 1200 seconds of the treatment.

As mentioned before, melt fatigue treatments produce only partially stable entanglement states, which, on reheating or annealing, kinetically loose the benefits of the treatment due to the alteration of the entanglement level. This is demonstrated in FIG. 5 by the recovery of the viscosity curve of the reference sample (no treatment) after treated specimens 2 and 3, which show a significant reduction of viscosity due to the treatment per the present invention, are reheated to 327° C., producing traces 4 and 5 after reheating. These reheated samples have the same viscosity curve as the reference sample, demonstrating the reversibility of the process of entanglement manipulation. This also demonstrates that the melt fatigue samples can completely recover their viscosity of non-treated state, and therefore that there has not been any modification of molecular weight due to the vigorous extensional shear vibration treatment.

Figure 7:
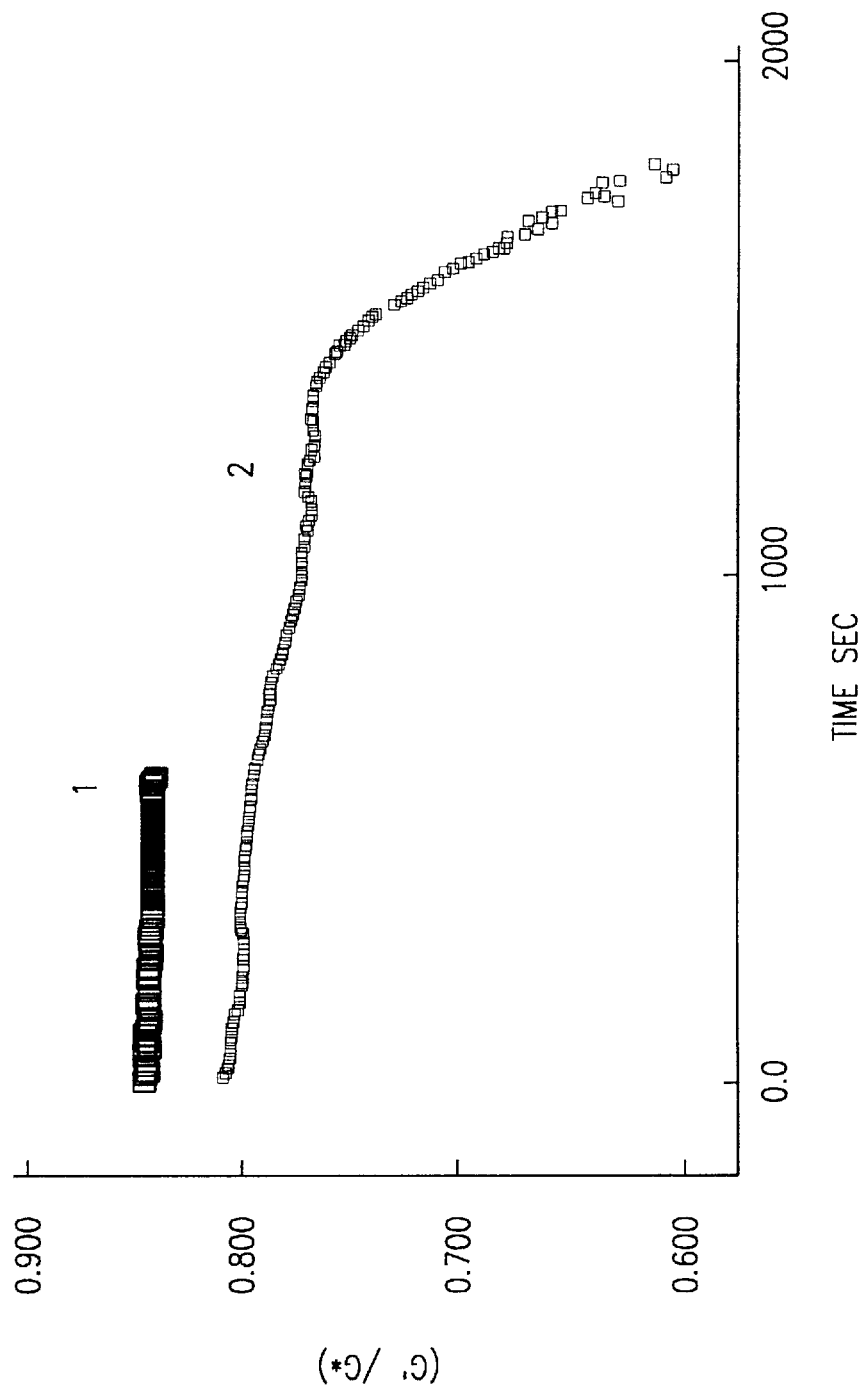
FIG. 7 is a graph of two melt fatigue treatments for polycarbonate grade 3 of FIG. 5.

FIG. 7 shows two melt fatigue treatments for polycarbonate grade 3:

Trace 1: Melt Fatigue at 220° C., 0.5% strain amplitude, 157 rad/s frequency, during 600 seconds.

Trace 2: Melt Fatigue at 230° C., 30% strain amplitude, 157 rad/s frequency, during 1800 seconds.

The corresponding viscosity curves for treatment 1 and 2 of FIG. 7 are already presented in FIG. 5. The viscosity curve for treatment 1 is not different from the reference curve (no treatment), demonstrating that, in torsion, if the strain amplitude is not large enough, even at very high level of elasticity, there is no effect on the melt viscosity when the treatment ceases. The viscosity curve for treatment 2 is Trace 3 of FIG. 5, which is found much lower than the reference viscosity curve and has already been commented upon for FIG. 5.

Figure 8:
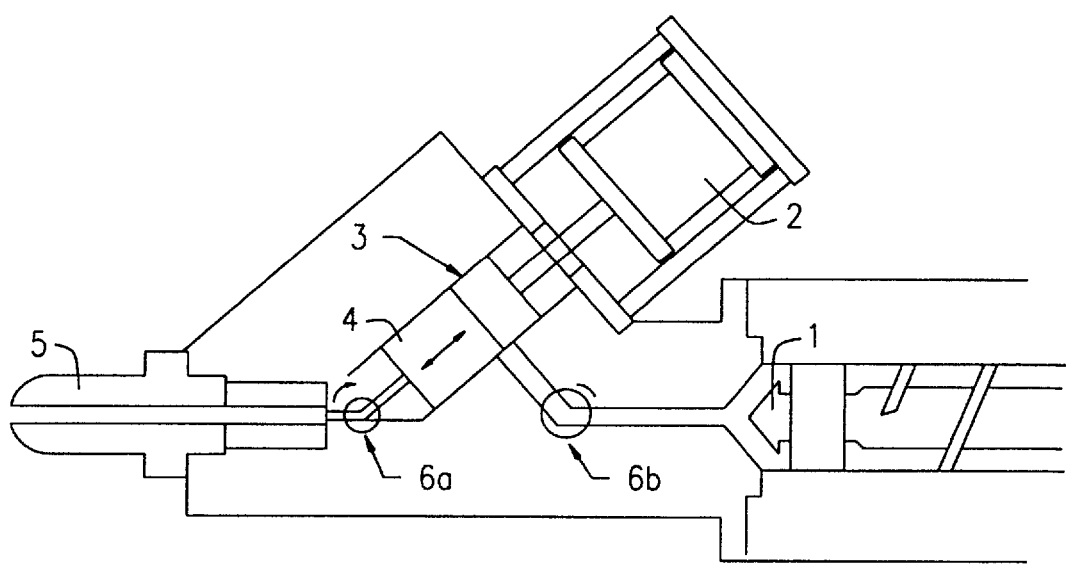
FIG. 8 is a schematic view of another embodiment of the invention.

FIG. 8 is a side view in section of an attachment to an injection molding unit and a mold to perform packing/melt fatigue prior to injection. Numeral 1 is an injection molding equipment of known design to which an hydraulic actuator equipped with servo-valve 2 is connected to a piston 3 which is movable toward a compression chamber closed at both ends when valves 6a and 6b are closed, to close access to a nozzle 5.

To operate, close valve 6a, open valve 6b to plasticate the melt into the packing chamber, and inject from the injection molding screw 1. Close 6b. Perform the treatment on the plastic in chamber 4 using piston 3 activated by actuator 2 Open 6a. Push the treated plastic out of chamber 4 through nozzle 5 either by pushing down the piston 3 completely or by pushing up piston 3 entirely, opening valve 6b and plasticating new untreated plastic into chamber 4, which has the effect of pushing down the treated plastic out of 4.

Figure 9:
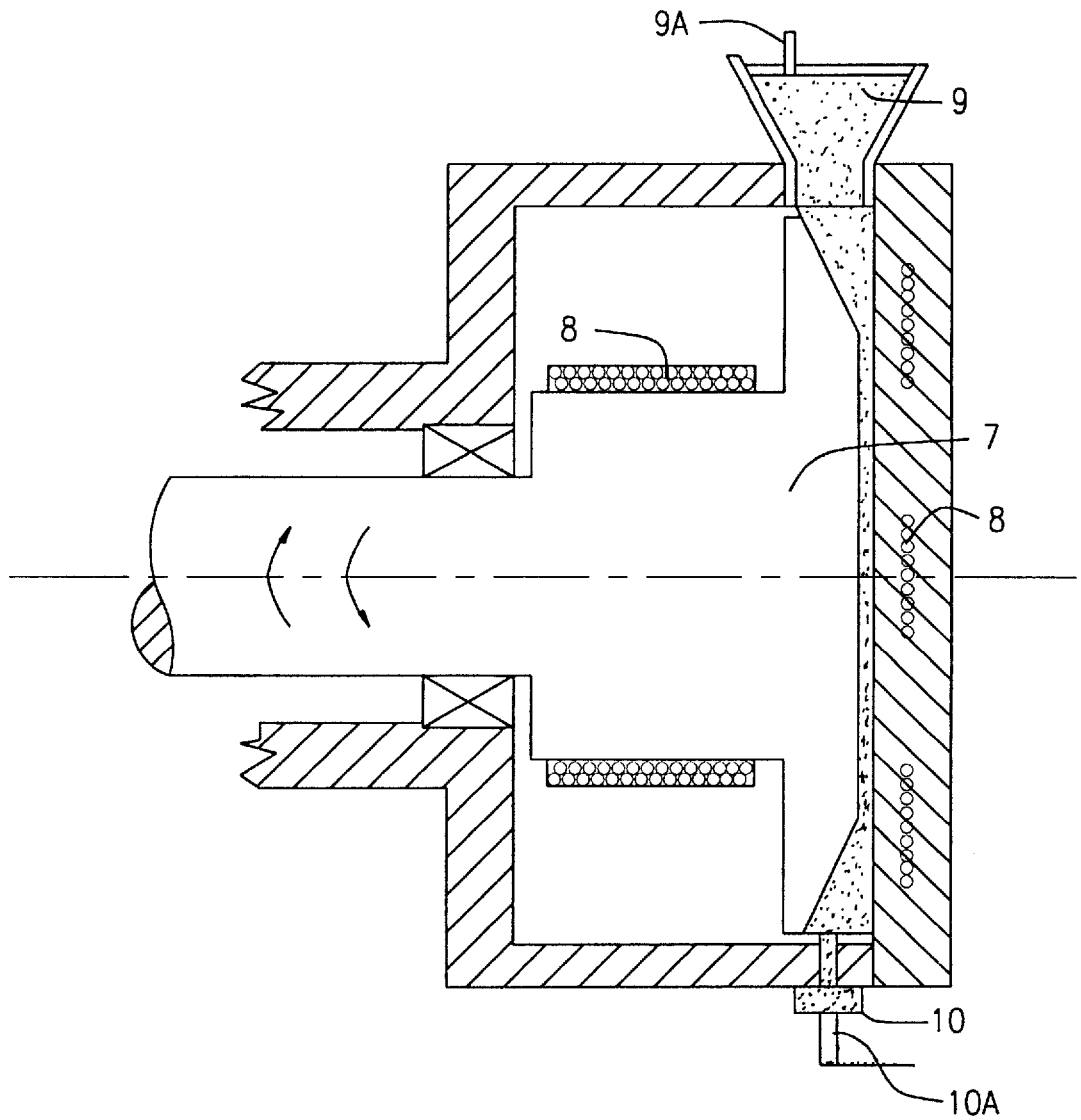
FIG. 9 is a schematic view of another embodiment of the invention.

FIG. 9 shows one example of equipment to melt fatigue a molten plastic under shear extension. The numerals identify parts as follows:

7 is a rotor which can either turn at specified speed or oscillate at given frequency and amplitude of strain. 8 is heaters elements, 9 a molten plastic reservoir at given temperature. 9A gear pump connected to new untreated plastic melt. 10 reservoir and controlled gate to outlet for treated plastic. 10A gear pump to return melt to 9.

In operation, this apparatus is designed to reduce the viscosity of melts. Untreated melt is introduced in reservoir 9 and fills the cavity including reservoir 10. In one embodiment of this invention gear pump 10A is not operational. Rotor 7 is put in motion to shear and fatigue the melt Temperature of the melt is controlled through heaters 8. Gate 10 is closed. The vigorously sheared melt is allowed to expand upward in 9 to avoid normal compression forces. The high rotation speed or oscillation frequency create centrifuge forces on the melt which put it in extension. The melt is purged out by opening the gate of reservoir 10 when the treatment is finished.

In another embodiment of the present invention, the melt which is shear vibrated in the central section is further put into controlled elongation by having the reservoir 10 in communication with reservoir 9 through a gear pump 10A. This gear pump sucks the escaping melt from 10 back to 9 until the fatigue treatment is finished, at which time the gate in 10 is open allowing the purge of all or a part of the treated melt and new untreated melt is pumped into 9 through gear pump 9A. The extension of the melt is controlled by controlling the rate at which the melt in 10 is pumped back in 9.

Figure 10:
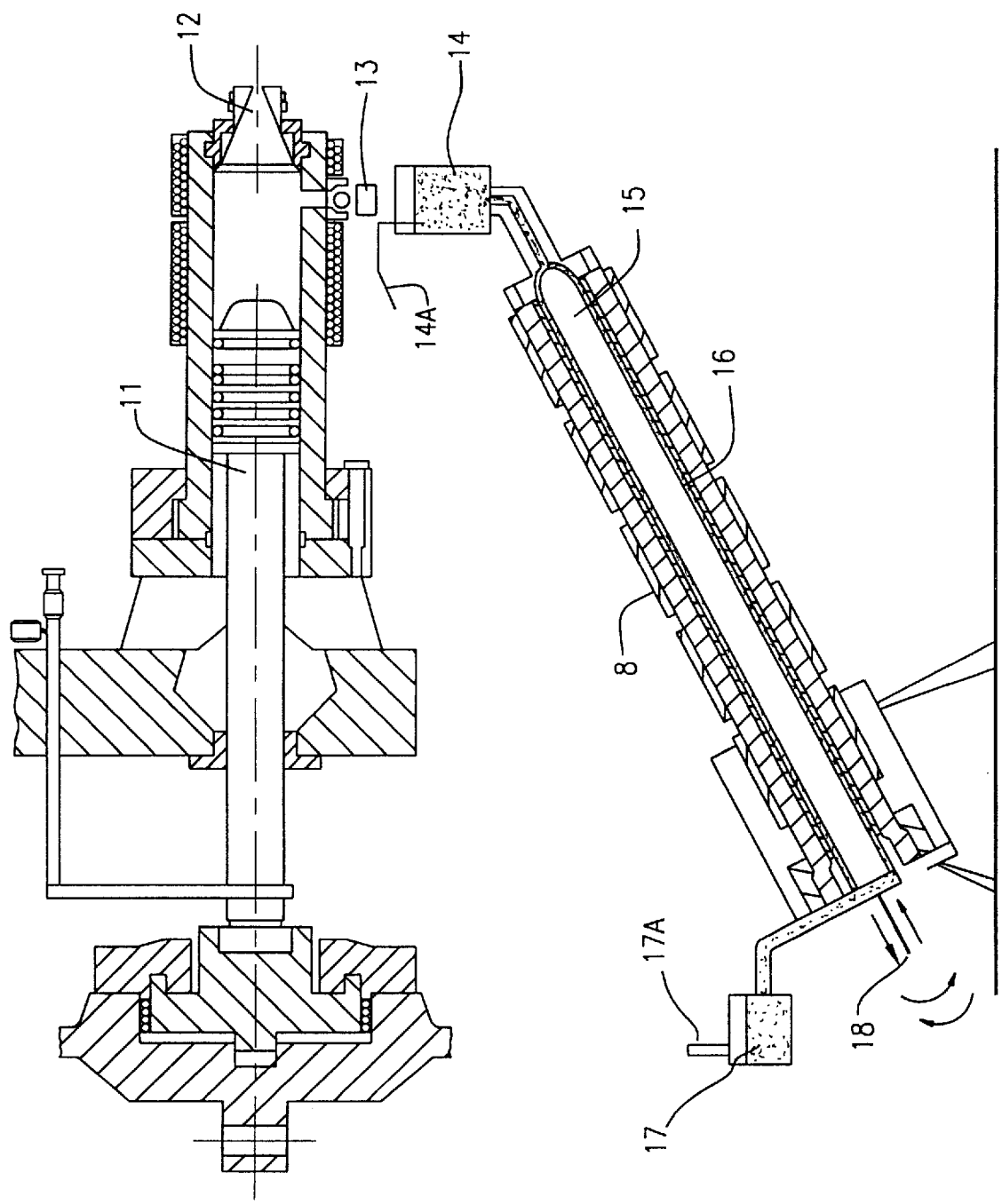
FIG. 10 is a schematic view of another embodiment of the invention.

FIG. 10 shows an apparatus to melt-fatigue in shear extension prior to injection by plunger, with identified elements as follows:

8 heater elements;
11 shooting plunger;
12 nozzle of injection;
13 gear pump to output melt from 14 to injection unit;
14 small tank;
14A gear pump returning plastic melt 14 to reservoir 17;
15 tube rotated and translated to produce shear fatigue on molten plastic in 16;
16 cavity for treated molten plastic;
17 reservoir of molten plastic with two inlets: either new untreated plastic or recycled molten plastic from gear-pump 14A;
17A gear pump feeding plastic in reservoir 17 to fatigue chamber 16; and
18 mechanism of oscillation(s) for the coaxial tube.

In operation, molten plastic is introduced in cavity 16 at the proper temperature and fills reservoirs 17 and 14. From 14 it can be fed into injection molding chamber through gear pump 13, or it can be returned to reservoir 17 by gear pump 14A. In one embodiment of this design, gear pump 14A is not operational and the melt is allowed to expand in reservoir 14 to avoid compressive forces due to normal stresses. Melt 16 is highly sheared under constant controlled temperature environment by the motion of 15 to produce melt fatigue in extension. The treated melt comes out in 14 and is pumped away by 13. Through action of 11 the treated melt is injected out through 12 into a mold. In another embodiment of the present invention, the injection nozzle 12 is valve gated and can close, creating a compressive chamber between shooting plunger 11 and injection nozzle 12 , which is used to pack and fatigue the melt for a certain time according to one of the variations of this invention before opening of valve gate at 12 and injection.

In another embodiment of this design, the treated melt at 14 is gear-pumped back (gear pump 14A) to the reservoir 17 at a certain chosen rate. The melt in reservoir 17 is gear pumped by pump 17A to cavity 16 at a slightly different rate than 14A, the difference being adjusted, along with the frequency of rotation and elongation of tube 15, to cause a shear extensional flow in cavity 16 while the vibration fatigues the melt. The levels in the reservoirs are monitored to determine the time at which gear pump 13 is activated to suck the content of the reservoir, or part of it, into the shooting chamber of the injection system, 11 and 12. New untreated molten plastic is simultaneously introduced in reservoir 17.

The degree of efficiency in lowering the viscosity by melt fatigue is determined by the length of the tube 15, the time of the treatment before opening gear pump 13, the amount of melt extension, which is driven by the difference in pumping rates between gear pumps 17A and 14A, and by the fatigue parameters, temperature, frequency and strain amplitude of the melt in cavity 16. All parameters are monitored and controlled by computer.

Figure 11:
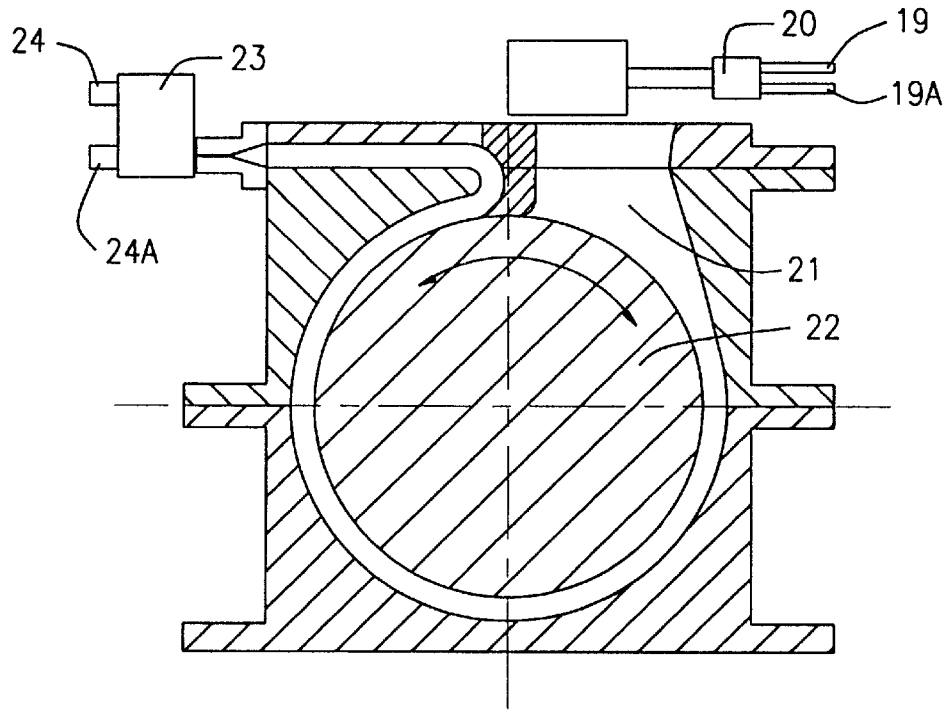
FIG. 11 is a schematic view of another embodiment of the invention.

FIG. 11 illustrates the oscillation of a coaxial cylindrical drum of the invention with elements as follows:

19 inlet and valve for untreated plastic melt;
19A inlet and valve for plastic melt returning from 24A;
20 gear pump to control flow of plastic and quantity of melt treated;
21 melt fatigue chamber;
22 thermally controlled oscillated drum;
23 sucking device or gear pump to let plastic melt out at controlled time and rate;
24 outlet connected to other processing operations such as pelletizers; and
24A outlet connected to inlet 19A.

In operation in the non-continuous mode of operation, untreated melt 21 is introduced at the desired temperature through inlet 19 and drum 22 is rotated to induce shear extension in the melt under oscillation. Plastic 19 is allowed to expand in the direction of the outlet. This is achieved by not filling completely cavity 21. When the fatigue treatment is completed, the treated melt is sucked out by action of a vacuum device which purges the remaining entrapped air (or gas) and plastic is gear pumped out to 24.

In another embodiment, once the untreated plastic melt is introduced through inlet 19, valve 19 is closed, but valves 19A and 24A are communicating and open. Gear pumps 20 and 23 are synchronized to continuously return plastic melt from 24A to 19A during the time of the treatment, and the rate difference between the pumps is controlled to cause a determined extension of the melt which is also sheared and fatigued in cavity 21 by vibration of drum 22.

Figure 12:
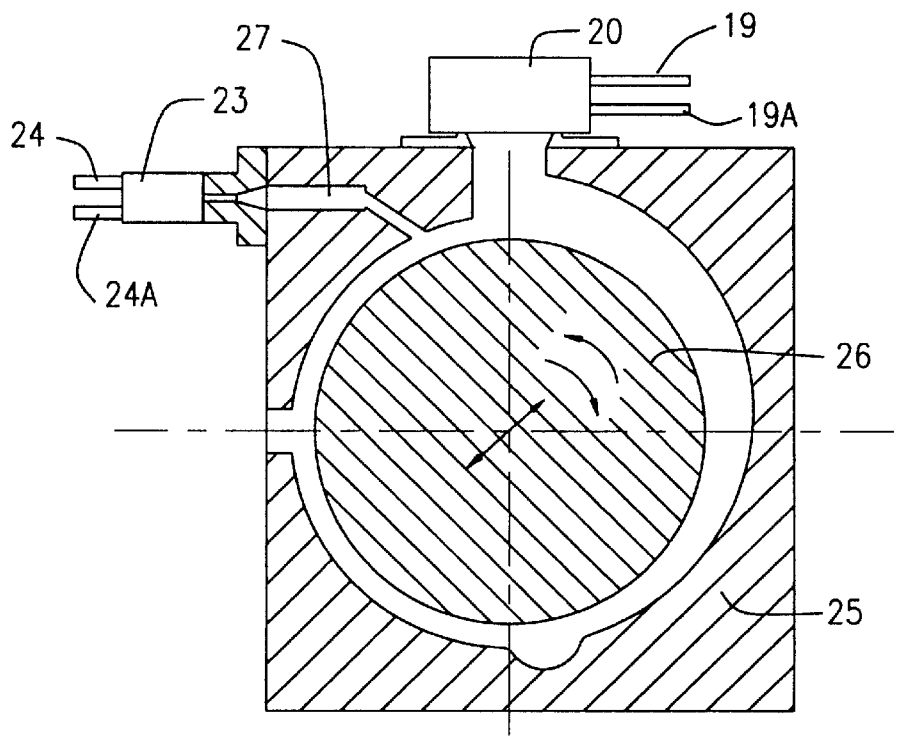
FIG. 12 is a schematic view of another embodiment of the invention.

FIG. 12 illustrates the oscillation of an eccentric cylindrical drum. The two modes of operation are strictly identical to the case of FIG. 11. The only important difference here is the two-axis motion of the drum to allow a certain amount of melt extension or orientation which is not produced by the apparatus in FIG. 11. 25 is the frame of the shearing apparatus. 27 is a detail of the connection of the melt cavity to the gear pump 23 and outlet 24.

Figure 13:
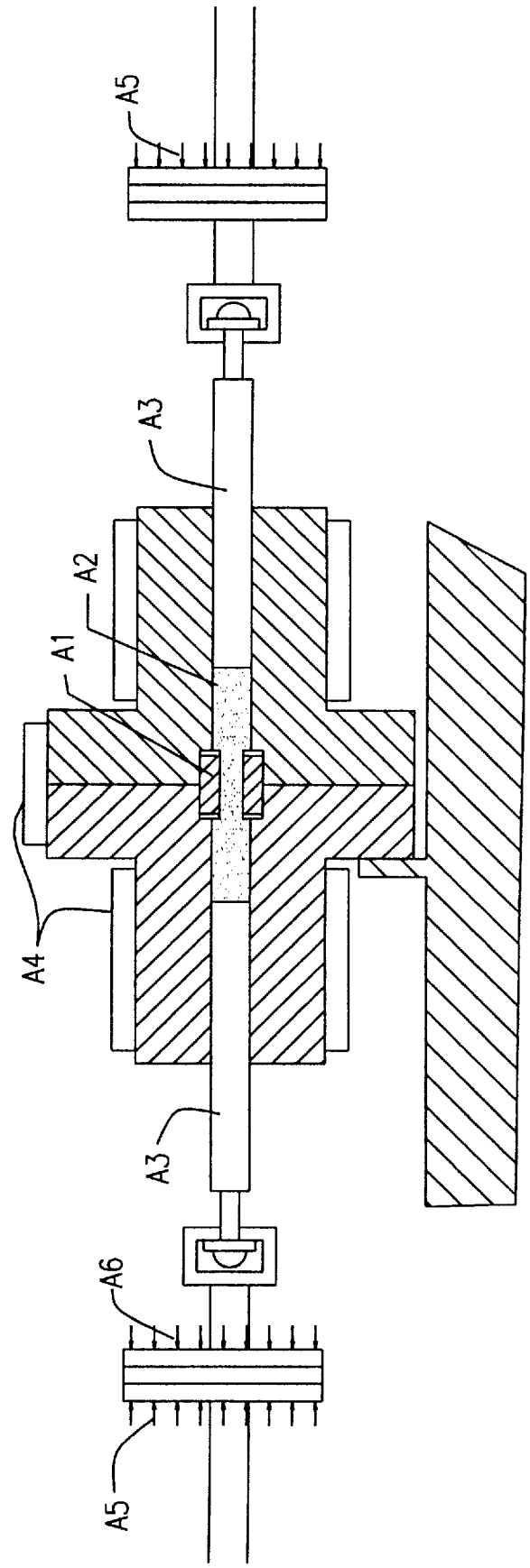
FIG. 13 is a schematic view of another embodiment of the invention.

FIG. 13 shows an apparatus with two pistons to perform packing/melt fatigue prior to another molding operation. Numerals in the figure identify parts as follows:

A1 Pressure and thermocouple sensors;
A2 polymeric melt to treat;
A3 pistons on both sides of confined melt;
A4 Electrical heaters;
A5 Hydrostatic pressure;
A6 Oscillation counterpressure;

In operation, the plastic polymer is introduced in the compression chamber and two pistons clamp it from both sides. The two pistons are connected to hydraulic actuators activated by servo-valves. The hydrostatic pressure A5 is controlled by the relative position of the two pistons. In addition, a packing vibration of controlled frequency and strain amplitude is applied on both pistons at the same time or on only one piston as shown on the Figure. The frequency and strain amplitude is commanded separately from the mean hydrostatic pressure. When the melt fatigue under vigorous packing pressure is completed, one of the two pistons retracts entirely and the other piston pushes the treated melt out of the compression chambers, where it is collected and pumped away to another molding operation.

While certain preferred embodiments of the present invention have been disclosed in detail, it is to be understood that various modifications in its structure may be adapted without departing from the spirit of the invention or the scope of the claims annexed to and forming a part of this disclosure.

Reference Cited

[1] J. P. Ibar, ACS Polym. Prep., 21(1), 215 (1980), "Vibro-Molding: A New Process to Mold Polymeric Materials".

[2] J. P. Ibar, .Polym-Plast. Technol. Eng.,17(1),11 (1981)., "*Rheomolding: A New Process to Mold Polymeric Materials*".

[3] J. Lemelson, U.S. Pat. No. 4,288,398 (1981).

[4] J. W. Pendleton, U.S. Pat. No. 3,298,065 (1965).

[5] P. S. Allen and M. Bevis, U.S. Pat. No. 4,925,161 (1985). Also R. A. Malloy in "Plastic Part Design for Injection Molding", Hanser/Gardner Publications (1993), pp. 59, 60.

[6] P. S. Allan et al., *Composites Manufacturing,* The Wolfson Center of Materials Processing, Brunel, The University of West London, Uxbridge, Middlesex,pp. 80–84 (June 1990).

[7a] J. P. Ibar, U.S. Pat. No. 4,469,649 (1984), "Method and Apparatus For Transforming The Physical Characteristics of Material By Controlling The Influence of Rheological Parameters."

[7b] J. P. Ibar, EP Patent 0 273 830 B1 (1991), "Method and Plant For Fabricating A Product By Injecting Material Into A Mold With Treatment of Injected Material."

[7c] J. P. Ibar, U.S. patent application Ser. No. 07/882,754 (1990) "Method For Blow Molding Hollow Articles of a Synthetic Material" and U.S. Pat. Nos. 5,326,393 and 5,271,876.

[7d] J. P. Ibar, U.S. Pat. No. 4,919,870 (1988), "Process of and Apparatus For Treating A Shaped Product"

[7e] J. P. Ibar, U.S. patent application Ser. No. 07/880,926 (1993), "Molding Deformable Materials With Use of Vibrating Wall Surfaces" and U.S. Pat. No. 5,306,129.

[7f] J. P. Ibar, U.S. patent application Ser. No. 08/124,147 (1993), "Molding Apparatus and a Method of Using the Same".

[7g] J. P. Ibar, U.S. patent application Ser. No. 08/138,673 (1993), "Improved Injection Molding Process and Apparatus" and U.S. Pat. No. 5,494,426.

[7h] J. P. Ibar, CA Patent 1,313,840 (1993) "Process and Device for Producing an Article by Injection of Material Into a Mold."

[7i] J. P. Ibar, EP Patent 0 274 317 (1993), "Process and Device for Extruding a Product in the Form of a Film, Plate, Tube, Bar or Thread."

[8] J. P. Ibar, Modern Plastics, vol. 25 No.1,85 (1995).

[9] A. Kikuchi and R. F. Callahan, "Quality Improvements Resulting from Rheomolding", SPE ANTEC 1996 Conference Proceedings (CD-ROM), Injection Molding, H4-New Technologies and Developments, Part I.

[10] G. L. Slonimskii, et Al, *Vysokomol. Soyed;* A16, 1, 232 (1974).

[11] S. N. Nurmukhametov, et Al, *Mekhanika Polimerov;* No. 4, 579 (1976).

[12] J. Casulli, J. R. Clermont, A. Vonziegler and B. Mena, "*The Oscillating Die: A Useful Concept in Polymer Extrusion*" Polym. Eng. Sci.; 30 (23), 1551 (1990).

[13] C. M. Wong, C. H. Chen and A. I. Isayev, "*Flow of Thermoplastics in an Annular Die under Parallel Oscillations*", Polym. Eng. Sci.; 30 (24), 1574 (1990).

[14] B. Mena, O. Manero and D. M. Binding, "*Complex Flow of Visco-elastic Fluids through Oscillating Pipes: Interesting Effects and Applications*", J. of Non-Newtonian Fluids Mechanics; 5, 427 (1979);

[15] B. Mena, O. Manero and D. M. Binding, Rheol. Acta; 16, 573 (1977).

[16] B. Mena, O. Manero and D. M. Binding, Rheol. Acta; 17, 693 (1978).

[17] L. R. Shmidt and J. L. Maxam, "Injection Molding Polycarbonate Compact Disks: Relationship between Process Conditions, Birefringence and Block Error Rate", SPE ANTEC 1988 Technical Papers, 34, 334 (1998).

[18] L. R. Shmidt and J. L. Maxam, "Injection Molding of Polycarbonate Optical Disks Using an Oscillatory Boundary Condition", SPE ANTEC 1992 Technical Papers, 38, 447 (1992).

[19] H. A. Hengesbach, K. W. Schramm, D. Woben, R. Sarholz, "Ausrustung von Spritzgiessmaschinen (Equipping of Injection Molding Machines), Report II-1 from IKV, at the Rhineland-Westphalian Technical University (RWTH) in Aachen (1976).

[20] K. W. Schramm, "Injection Molding of Structural Parts Consisting of Plastic Molding Materials Utilizing Forced Oscillating Flow Processes", Doctor-Engineer Thesis, Rhenish-Westphalian College of Technology (1976).

I claim:

1. A method for controlling the viscosity of molten polymers prior to a molding operation comprising the steps:

raising the temperature of a plastic resin until it melts;

submitting the plastic melt, at constant temperature, to the action of a vigorous mechanical vibration, at a constant amplitude and at a frequency of up to 100 Hz, causing the melt to become highly elastic, and simultaneously causing it to fatigue, for a certain time at that temperature, and adjusting the vibration parameters to maintain the high elastic state, until the state of entanglement between the macromolecules has altered to a desired level, as measured by a change in viscosity and melt modules of elasticity of the melt;

conveying the melt to a molding station which is spaced away from the action of vigorous mechanical vibration; and submitting the melt to a molding operation selected from the group consisting of a simple quenching operation, an extrusion operation, an extrusion process followed by quenching to produce pellets or compounds, an injection molding operation, a blow-molding operation and a thermoforming operation.

2. A method according to claim 1, wherein the vibration during fatigue of the melt is done in shear mode, with minimum or no pressure on the melt, in order to lower the melt viscosity prior to the molding operation.

3. A method for controlling the viscosity of molten polymers prior to a molding operation comprising the steps:

raising the temperature of a plastic resin until it melts;

submitting the plastic melt, at constant temperature, to the action of a vigorous mechanical vibration, at a constant amplitude and frequency, causing the melt to become highly elastic, and simultaneously causing it to fatigue, for a certain time at that temperature, and adjusting the vibration parameters to maintain the high elastic state, until the state of entanglement between the macromolecules has altered to a desired level, as measured by a change in viscosity and melt modules of elasticity of the melt;

conveying the melt to a molding station; and submitting the melt to a molding operation selected from the group consisting of a simple quenching operation, an extrusion operation, an extrusion process followed by quenching to produce pellets or compounds, an injection molding operation, a blow-molding operation or a thermoforming operation;

the vibration of the melt being done in compression mode, with minimum or no shear forces on the confined melt in order to increase the melt elasticity prior to the molding operation.

4. A method according to claim 2 wherein the shear vibration occurs simultaneously with another shearing force causing the melt to fatigue in extension.

5. A method according to claim 2 wherein two shear vibration occur simultaneously on two axes, one shear vibration to raise the value of the elasticity ($G'/G^*$) of the melt between 0.75 and 0.93, by adjustment of the melt temperature, frequency of vibration and strain amplitude, the other vibration to put the melt under extension during fatigue.

6. A method according to claim 3 wherein the compressive vibration consists of two components simultaneously working together, one compressive vibration activated to raise the value of the elasticity ($K'/K^*$) of the melt between 0.75 and 0.93, by adjustment of the melt temperature, frequency of vibration and pressure excursion amplitude, the other compressive force causing the melt to fatigue while increasing the average pressure on the confined melt.

7. A method according to claim 3 wherein two compressive vibrations simultaneously work together, one compressive vibration activated to raise the value of the elasticity ($K'/K^*$) of the melt between 0.75 and 0.93, by adjustment of the melt temperature, frequency of vibration and pressure excursion amplitude, the other compressive vibration causing the average pressure of the confined melt to oscillate periodically so as to fatigue it in compression.

* * * * *